Nov. 30, 1965 D. C. MANNING 3,221,307

AUTOMATIC TAPE UNIT SELECTOR

Filed Dec. 7, 1960 3 Sheets-Sheet 1

INVENTOR
DONALD C. MANNING

BY Grant A. Hauptman

ATTORNEY

Nov. 30, 1965 D. C. MANNING 3,221,307

AUTOMATIC TAPE UNIT SELECTOR

Filed Dec. 7, 1960 3 Sheets-Sheet 2

Nov. 30, 1965 D. C. MANNING 3,221,307

AUTOMATIC TAPE UNIT SELECTOR

Filed Dec. 7, 1960 3 Sheets-Sheet 3

United States Patent Office 3,221,307

Patented Nov. 30, 1965

3,221,307
AUTOMATIC TAPE UNIT SELECTOR

Donald C. Manning, Poughkeepsie, N.Y., assignor to International Business Machines Corporation, New York, N.Y., a corporation of New York Filed Dec. 7, 1960, Ser. No. 74,308
6 Claims. (Cl. 340—172.5)

This invention relates to electronic apparatus and more particularly to apparatus for permitting a supervisory unit to assign identifying addresses to a number of sequentially arranged stations.

Modern data processing systems are capable of handling on the order of one hundred separate input/output devices. These input/output units are usually connected to the data processing system by means of data paths and control paths common to a number of units. Therefore, it is necessary that an address be assigned to each one of the units sharing a common data or control path to permit the data processor to distinguish one input/output unit from another. It is common practice for the address of an input/output device, such as a magnetic tape unit, to be manually set by an operator. The program stored in the data processor then exchanges data with the tape units on the assumption that there has been no error in the assignment of the unit addresses.

Typically ten or more tape units are connected to each input/output channel of a computer. Ten address lines run from the computer for each channel. Each one of the magnetic tape units has ten address lines connecting to corresponding ones of the ten address lines from one computer channel. A signal on one of the address lines selects the tape unit which has been manually set to correspond to this line. Therefore, if a tape unit is not correctly set to correspond to one of the lines from the computer then that tape unit cannot be selected by the computer even though the program calls for it. Similarly, if more than one magnetic tape unit is manually set to the same address then when the computer program executes an instruction corresponding to that address more than one tape unit will respond. Even assuming that the information on the magnetic tape is not irretrievably lost due to erroneous manual settings, a great deal of computer time is lost due to such errors. It can be seen that as the number of input/output units attached to one computer channel increases the chance of error increases also. There is a need for apparatus which automatically assigns identifying characteristics to a number of tape units connected to a date processor. No prior devices permit tape unit addresses to be automatically selected after only one manual operation: placing tapes, each specifying a desired address, into tape units. Such a device entirely eliminates the errors inherent in manual assignment of addresses to large numbers of tape units.

It is, therefore, an object of this invention to provide apparatus for assigning unique address characteristics to each of a number of devices connected to a supervisory system.

It is still another object of this invention to provide apparatus for assigning addresses to each one of a number of stations connected to a supervisory unit according to signals originated in the corresponding stations.

Still another object of this invention is to provide apparatus for assigning addresses to a number of tape units connected to a computer in accordance with signals present on the corresponding tape units.

A further object of this invention is to provide apparatus for permitting assignment of addresses by a supervisory unit to those connected tape units which are available.

The foregoing and other objects, features and advantages of the invention will be apparent from the following more particular description of a preferred embodiment of the invention, as illustrated in the accompanying drawings.

The above objects are achieved in a system where a number of magnetic tapes are connected to a computer through common data and control paths, by providing a circuit for initially selecting the tape units individually in a predetermined order. As each tape unit is selected the tape is interrogated and read for address information. The address indicated on the tape of the selected tape unit is then sent to the computer. Signals are returned to the tape unit by the computer on the normally available address lines connecting all of the tape units in common, for setting a register, in the selected tape unit, to the address indicated on the normal address lines. After all of the tape units that are available are set in this manner, normal operation is possible. Whenever the normal address lines between the computer and the tape units indicate an address which corresponds to an address stored in a register of a tape unit the tape unit which contains the corresponding address is selected.

Figure 1:
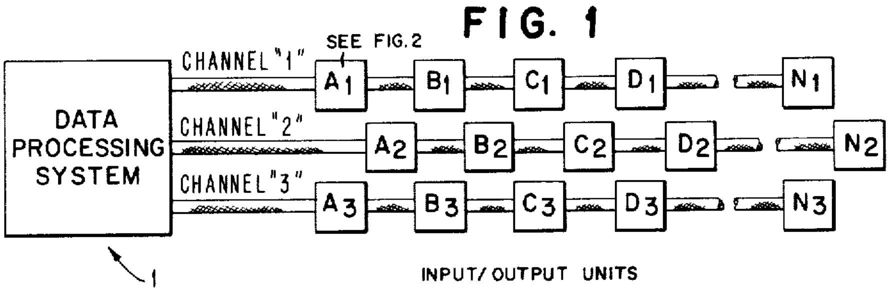
FIG. 1 is a block diagram showing a data processing system having three input/output channels.

Referring to FIG. 1 there is shown a data processing system 1 having three channels: channel 1, channel 2 and channel 3. Each channel has a number of input/output units: A, B, C, D through N connected to each channel, each input/output unit, for example A1, including a Tape Unit and an Automatic Tape Unit Selector. The data flowing between the data processing system 1 and the input/output units of any one channel are transferred on a common data path. Similarly, control signals are sent by the data processing system 1 to the input/output units on any one channel by a common control path.

Figure 2:
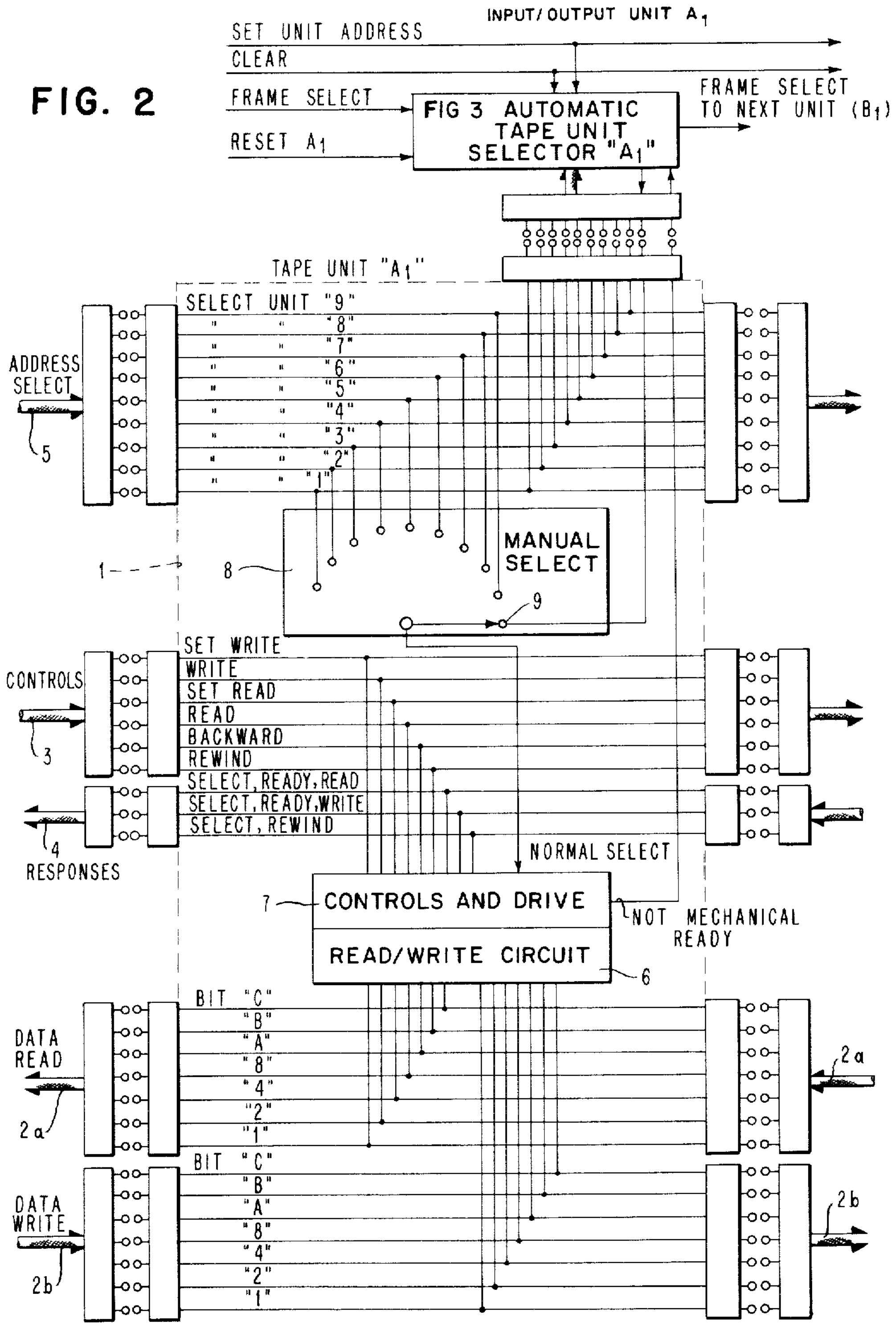
FIG. 2 is a block diagram showing the attachment of apparatus embodying the invention to a standard tape unit.

Referring to FIG. 2, the tape unit A1 connected to channel 1, in FIG. 1, is shown in greater detail. It can be seen that data buses *2a* and *2b* which come from the data processing system 1 and go to the tape unit B1, are available to tape unit A1 in parallel. Similarly, the control signals on the control bus 3, from the data processing system 1, run to the tape unit A1 (and then to the balance of the tape units connected to channel 1) in parallel. Similarly, the response signals from each one of the tape units on channel 1 enter the response bus 4 in parallel. The address signals, from the data processing system 1 to each one of the tape units on channel 1, are applied via the address select bus 5.

Still referring to FIG. 2, the standard tape unit A1 will be explained as an example of the type of substation useable with a supervisory system. In this case, it will be assumed that the standard type unit A1 is used with a data processing system capable of generating a number of control signals and receiving and transmitting data. Seven bit binary coded decimal characters are read from and written into the read/write circuits of the typical tape unit by means of the data buses *2a* and *2b*, to which the tape unit A1 is connected in parallel. The tape controls and tape drive mechanism 7 are connected to the read/write circuits 6, which are in turn connected to the data buses *2a* and *2b*. Any one of the nine tape units connected to the channel on which tape unit A1 is connected may be selected by bringing up the proper one of the ten lines comprising the address select bus 5. The tape unit is set to be responsive to only one of these lines by means of the manual select 8. For instance, if the manual select rotor arm is set to the fourth terminal then whenever the line select unit 4 comes up, the output line labeled "normal select" will come up. The manual select 8 is not utilized in this invention, the contact arm being connected to a special terminal 9 permitting operation of the "normal select" line by means of the automatic tape unit selector comprising this invention.

The control signals applied on the control bus 3 are as follows: set write, write, set read, read, backward and rewind. It can be seen that tape unit A1, and all other tape units B1 through N1, are connected in parallel to these lines. These lines have no effect on the controls and drive 7 of the tape unit A1 unless the "normal select" line is also up. During normal operation of a typical tape unit this coincidence occurs only when the assigned address of the tape unit is selected by bringing up the proper one of the select unit lines of the address select bus 5. Thus a coincidence of signals on the "normal select" line and the "set write" line readies the tape unit for the write operation. A coincidence of signals on "normal select" line and the "set read" line readies the tape unit for the reading operation. When the tape unit is mechanically ready a proper one of the lines "select, ready and read" and "select, ready and write" comes up, signalling the computer that the selected tape unit is ready to read or write. When the line "read" comes up the exact instant of reading is determined. When the line "write" comes up the exact instant of writing is determined. When the line "backward" is brought up the direction of reading or writing is reversed. If the line "rewind" is brought up the tape in the tape unit is rewound, the line "select and rewind" coming up to indicate this condition. It is obvious that there are many other types of magnetic tape units useable with this invention and that other types of controlled units other than magnetic tape units may be used with this invention.

Still referring to FIG. 2, the automatic tape unit selector A1 receives signals from the select unit lines forming the address select bus 5 and controls the normal select line running to the controls and drive of the tape unit A1. Thus, the automatic tape unit selector of this invention replaces the manual select 8 of the typical tape unit. The automatic tape unit selector is reset by the line labeled "reset A1." All of the automatic tape unit selectors associated with the tape units are reset at one time by means of the line labeled "clear." The automatic tape unit selector is set to indicate a unit address present on the select unit line represented by signal on the select unit lines when the input line "set unit address" come up. The A1 automatic tape unit selector is selected for setting by bringing up the line "frame select." The automatic tap unit selector is connected to the next automatic tape unit selector B1 by means of the line labeled "frame select to next unit B1."

Still referring to FIG. 2, apparatus embodying the invention is illustrated by a block entitled "automatic tape unit selector A1" having the following inputs: "set unit address," "clear," "frame select," "reset A1," "not mechanical ready" and nine "select unit" lines from the address select bus 5. The automatic tape unit selector A1, and all other automatic tape unit selectors (corresponding to tape units A through N), is connected in parallel to the "set unit address," "clear" and "select unit" lines. Separate "reset" and "not mechanical ready" lines are provided for each automatic tape unit selector. A "frame select" line is provided from the computer to the first automatic tape unit selector on each channel (selector A1 in this case) only. Succeeding automatic tape unit selectors are provided with connecting lines labeled "to next unit." Each automatic tape unit selector generates signals on a line connected to the "normal select" line of the corresponding tape unit.

Figure 3:
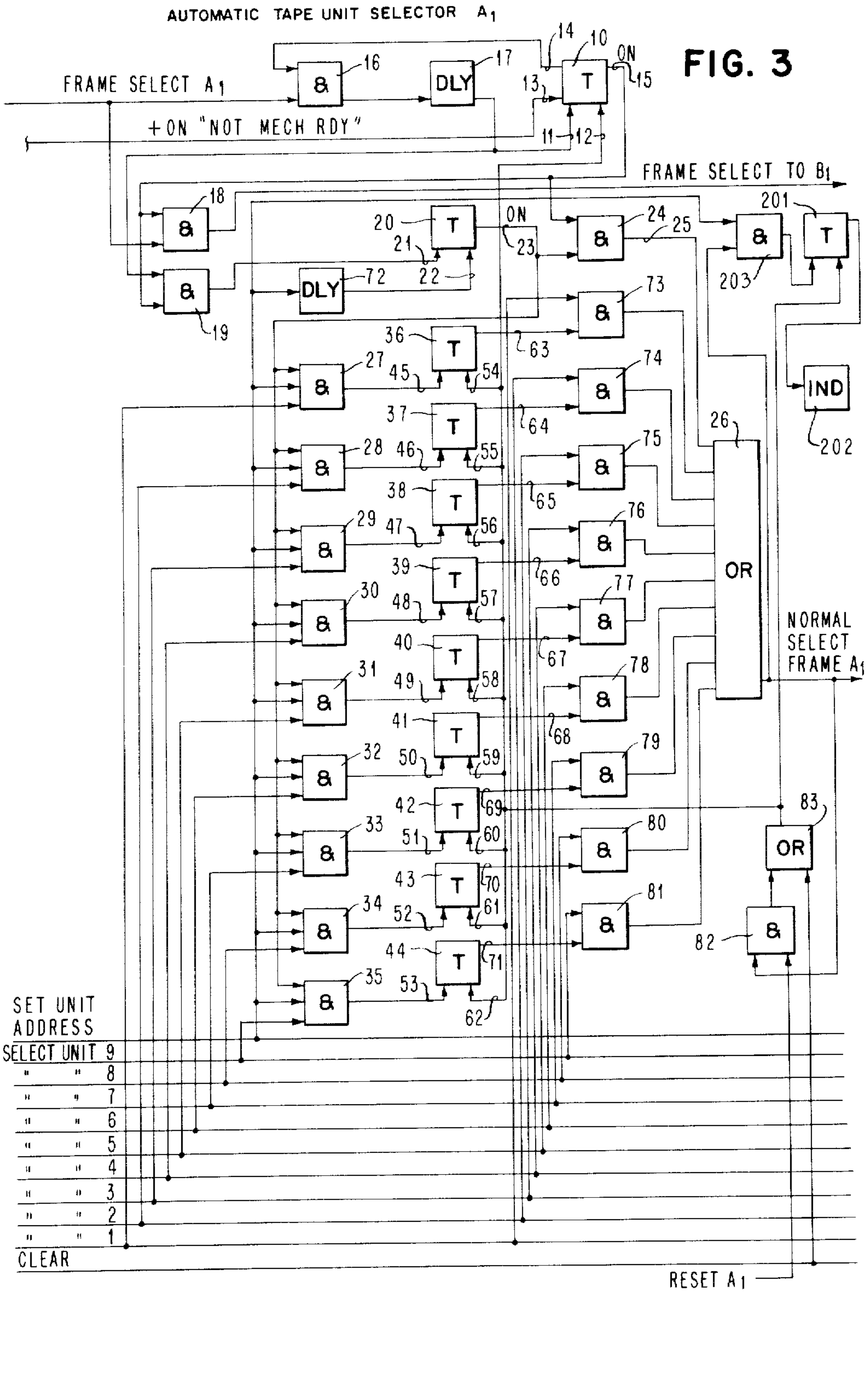
FIG. 3 is a detail logic level diagram showing a tape unit selector embodying the invention.

Referring to FIG. 3, the structure of apparatus embodying the invention will now be described. There is provided a trigger 10 having an input 11 for setting the trigger to an ON state bringing UP the output line 15. There is provided an input 12 for setting the trigger 10 OFF bringing UP the output line 14. A signal on the input 13 to the trigger 10 sets the trigger ON whenever the line "on not mechanical ready" is UP. The trigger 10 may be any standard trigger circuit known in the art. When a signal appears on the "frame select" input line the trigger input line 11 comes UP, due to the AND circuit 16 and the delay circuit 17 if the trigger 10 was set OFF, so as to hold output line 14 UP. These circuits are standard circuits well known in the art. The AND circuit 18 receives one input from the trigger 10 output line 15 and another input from the "frame select A1" line. When these two signals coincide the output line "to B1" comes UP, transmitting a "frame select" signal to the next tape unit B1. Due to the delay circuit 17, this occurs only if the trigger 10 was ON before the "frame select" signal is applied. It can, therefore, be seen that a plurality of triggers 10, AND circuits 16 and 18 and delay circuit 17 comprise a ring counter of well known design.

The AND circuit 19 receives one input from the ON output 15 of the trigger 10 and another input from the output of the delay circuit 17. As a result the input 21 of the trigger 20 comes UP setting the trigger 20 ON, bringing UP the output line 23 whenever trigger 10 is set ON by a "frame select" signal. If the trigger 10 is set ON by a signal on the line "not mechanical ready," trigger 20 will not be set ON because only one input of the AND circuit 19 will be UP. When both triggers 10 and 20 are set ON, the output 25 of AND circuit 24 is UP causing the "normal select" line for frame A1 (connected to the OR circuit 26) to come UP. Reference to FIG. 2 indicates that when the "normal select" line comes UP at the same time as a read control line the tape mounted in the tape unit A1 is read, causing data to leave the tape unit on the data read bus *2a*. Referring again to FIG. 3, if the line "not mechanical ready" connected to the input 13 of the trigger 10 is UP the trigger 10 is set ON and the trigger 20 remains OFF. As a result the line "frame select to B1" comes UP, but the "normal select" line remains DOWN. In this manner the next tape unit is tested and the tape unit A1 is skipped.

The computer used in conjunction with this invention interprets the information available on the data bus *2a* from the tape unit and drives therefrom signals indicative of the address to be assigned to this particular tape unit. This address appears as a signal on one of the "select unit" lines 1 through 9 in FIG. 3. The tape unit A1 is set to the address indicated by the signal on the indicated address line, if the line "set unit address" is brought UP by the computer and if trigger 20 output line 23 is UP, by energizing the one of the AND circuits 27 through 35 which corresponds to the energized addressed line. For instance, if the trigger 20 is ON, the "set unit address" line is UP and a signal appears on the "select unit" line 8 then all three inputs of the AND circuit 34 are UP. When the output of one of the AND circuits 27 through 35 comes UP, the corresponding input 45 through 53 of the triggers 36 through 44 comes UP bringing UP the corresponding output 62 through 71. Thus, if the output of the AND circuit 34 comes UP, the input 52 of the trigger 43 comes UP setting that trigger ON and bringing UP the output 70. In this manner the address indicated by signals on one of the "select unit" lines is recorded as states in the triggers 36 through 44 of a selected tape unit whenever the "set unit address" line is UP.

When the line "set unit address" comes UP the trigger 20 is turned OFF causing its output line 23 to go DOWN when its input line 22 comes UP. This occurs a fixed time (determined by the delay circuit 72) after the "set unit address" line comes UP in order to permit one of the triggers 36 through 44 to be set if there is a signal on one of the "select unit" lines. As soon as the trigger 20 is set OFF the signals on the "select unit" lines have no further effect on the triggers 36 through 44. Instead, subsequent signals occurring on the "select unit" lines cause the "normal select" line to come UP if there is a correspondence of a signal on any one of the "select unit" lines with an output on a corresponding one of lines 63 through 71, due to the AND circuits 73 through 81 and the OR circuit 26. For instance, if the address line 8 comes UP, and the trigger 43 was set ON, then the AND circuit 80 inputs are both UP, bringing UP the output of the AND circuit 80, bringing UP the corresponding input of the OR circuit 26 and bringing UP the "normal select" line for frame A1. Referring to FIG. 2, once the "normal select" line comes UP any function called for by a signal on the control bus 3 may be executed by the tape unit A1.

Tape unit selector A1 may alone be reset by selecting tape unit A1 (bringing UP the address line corresponding to the unit address previously automatically assigned to the tape unit) and bringing UP the line "reset A1." This brings UP both inputs to the AND circuit 82, bringing UP the output of the OR circuit 83, which brings UP the OFF inputs 12 and 54 through 62 of the triggers 10 and 36 through 44 and resets all of these triggers to the OFF condition. All of the tape units on one channel may be reset at the same time by means of a signal on the "clear" line connected to one input of the OR circuit 83 which has an effect on each tape unit selector identical to the one just described for tape unit selector.

Both inputs of the AND circuit 203 come UP when both the "normal select" line and the "set unit address" line are together UP. This sets the trigger 201 ON, activating a visual or audible indicator 202 which manifests that the automatic tape unit selector A1 is in use. This indication continues until the output of the OR circuit 83 comes UP, due to a "reset A1" or a "clear" signal; the trigger 201 then being set OFF, deactivating the indicator 202.

Figure 4:
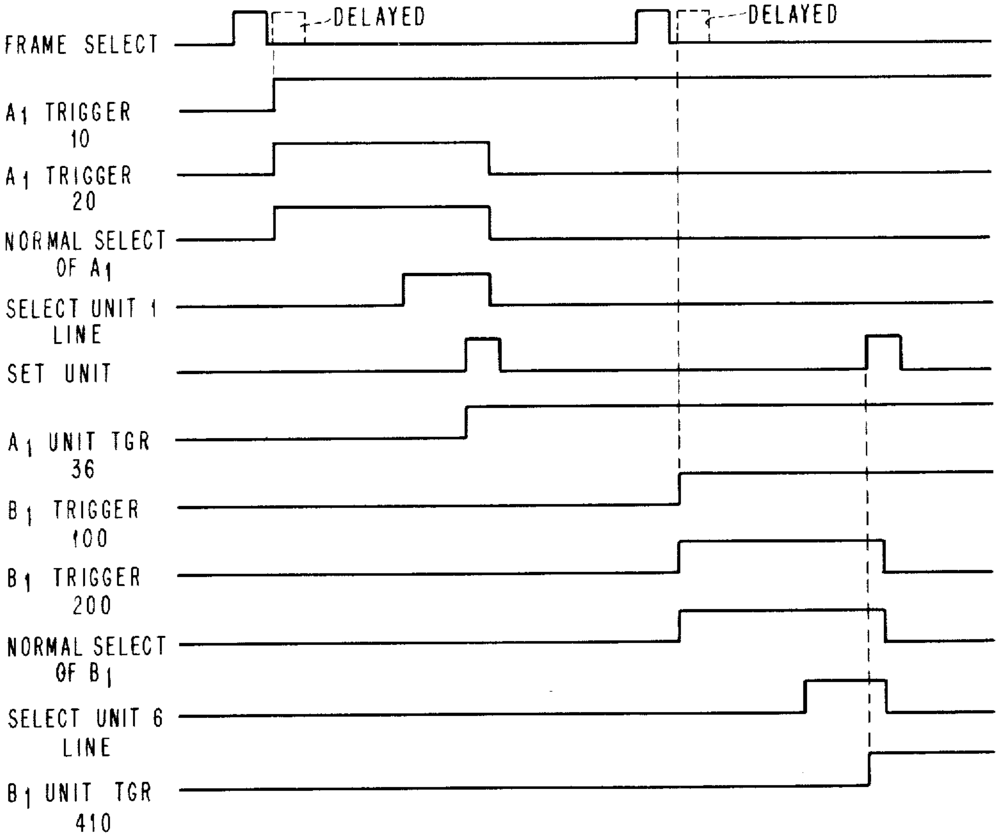
FIG. 4 is a diagram showing wave forms present at the indicated points in FIG. 3.

The operation of the apparatus shown in FIGS. 2 and 3 will now be described with reference to the wave forms in FIG. 4. Referring first to FIG. 2, the "frame select" line is brought UP, for a period indicated by the pulse labeled "frame select" in FIG. 4. Referring now to FIG. 3, it can be seen that the "frame select" pulse is applied to the AND circuit 16 of the tape unit selector A1. In this example, all of the triggers are initially OFF so that the trigger 10 is set ON through the delay circuit 17 and the input 11. The "frame select" pulse is also applied to one input of AND circuit 18, but no output results since trigger 10 is OFF holding the other input DOWN. The input line "not mechanical ready" is assumed to be DOWN. A combination of the delayed "frame select" pulse for tape unit A1 through the delay 17 and the ON condition of the trigger 10 results in a signal on the output line 15, causing the output of the AND circuit 19 to bring UP the input 21 of the trigger 20 setting it ON and bringing UP the output line 23. Reference to wave forms of FIG. 4 shows that due to the delay circuit 17 the A1 trigger 10 is ON after the "frame select" pulse to the tape unit A1 has ended so that no "frame select" pulse is sent to the tape unit B1 until the next "frame select" signal occurs. The combination of a signal on the output line 23 of the trigger 20 and the output line 15 of the trigger 10 (indicating that both triggers are ON) causes the output 25 of the AND circuit 24 to come UP and brings UP the associated input of the OR circuit 26. This causes the "normal select" line for frame A1 to come UP. Referring to FIG. 2, it can be seen that this "normal select" line goes to the controls and drive of the standard tape unit A1. The combination of a "normal select" line input, a "mechanical ready" signal and a control input "set read" input brings UP the response output of the tape unit: "select ready and read." Whenever the "read" control line is brought UP the first character on the tape of the tape unit A1 will be read out to the computer on the data bus **2*a***.

Still referring to FIG. 2, the signals sent to the computer on the data read bus 2 corresponding to bit positions CBA8421 are as follows: 0000001 (representing the quantity 1 with odd parity), indicating that the tape unit A1 is to be set to address 1. The computer interprets this information and subsequently brings UP the "select unit" input line 1. Referring to FIG. 3, one input of the AND circuit 27 is brought UP by the "select unit 1" signal. Since the trigger 20 is set ON the output line 23 is UP holding UP a second input of the AND circuit 27. When the "set unit address" line is brought UP by the computer, the third input of the AND circuit 27 comes UP causing the output of the AND circuit 27 to rise and set the trigger 36 ON by means of input 45. The output 63 of the trigger 36 is applied to an input of the AND circuit 73. Referring to FIG. 4, it can be seen that no output occurs from AND circuit 73 once the signal on the "select unit 1" line ends. Referring again to FIG. 3, the "set unit address" pulse is also applied to the delay circuit 72 which, by means of the input 22, sets OFF the trigger 20 causing the output line 23 to drop. This terminates the "normal select" line UP condition. The trigger 201 was set ON when the "set unit address" line came UP, and now remains in the ON state.

If during normal operation of the tape unit A1 a signal appears on the "select unit 1" line the "normal select" line will come UP due to the coincidence of inputs at the AND circuit 73. No other "select unit" signals will have this effect on tape unit selector A1. The tape unit selector A1 may be reset by bringing UP the "select unit" line 1 and applying a signal on the input line "reset A1." This also sets the trigger 201 OFF.

The next frame select pulse applied to the tape unit selector A1 causes one input of the AND circuit 18 to rise. Since the other input of the AND circuit 18 is UP, the trigger 10 being set ON, the output of the AND circuit 18 rises sending a frame select pulse to the input of the next tape unit B1. Referring to FIG. 4, a B1 trigger 100 (not shown), equivalent to the A1 trigger 10 shown, is set ON after a delay. A B1 trigger 200 (not shown), equivalent to the A1 trigger 20 shown, is set ON and the "normal select" line of the tape unit B1 comes UP. Assuming that a "set read" signal has been sent to the tape unit B1 the response line from the tape unit B1 to the computer "select, ready and read" is UP at this time. Therefore, when a "read" control signal is applied to the tape unit B1 by the computer the data read bus **2*a* lines CBA8421 come UP as follows: 1000110, indicating that the tape unit B1 is to be set to the tape unit address 6. The computer recognizes this signal and causes the "select unit 6" address line of the address select bus 5 to come UP. When the set unit address pulse appears from the computer the triggers corresponding to the address 6 is set. In the tape unit B1 this is trigger 410 corresponding to the trigger 41 shown for the tape unit selector A1. Thereafter, whenever the "select unit 6" lines come UP, tape unit B1** is selected for an operation indicated by the control lines shown in FIG. 2.

In summary, apparatus for selecting a number of addressable units connected to a common selection path has been described in detail. This apparatus provides means for initially selecting the addressable units individually in a predetermined order and then assigning unique address characteristics to each of the units as selected. Future selection signals thereafter select only the tape unit having an address corresponding to the selection signal. It is obvious that this invention is applicable to any form of addressable units, tape units having been described only for purpose of illustration.

While the invention has been particularly shown and described with references to a preferred embodiment thereof, it will be understood by those skilled in the art that various changes in form and details may be made therein without departing from the spirit and scope of the invention.

In the claims:

1. Apparatus for selecting in random order a number of addressable units connected to a common path, including: means for initially selecting said units individually in a predetermined order; and means connected to aforesaid means, for assigning unique address characteristics to each of said units as selected.

2. Apparatus for selecting desired ones of a number of addressable units connected to a common path, including: means for initially making said units individually operative in a predetermined order; first means, associated with each of said units, for indicating a unique address for each associated unit; and second means, associated with each of said units, for receiving and retaining the unique address associated with each unit as each unit is made operative.

3. Apparatus for permitting a supervisory unit to assign identifying addresses to a number of sequentially arranged stations including: storage means at each station for recording as states signals corresponding to an externally assigned address; identifying means at each station for storing as states signals corresponding to said assigned address; first means at each station, controllable by said supervisory unit, for selecting each of said stations in sequence; second means at each station, connected to said storage means and to said supervisory unit, for generating signals corresponding to the assigned address recorded as states in each station storage means as selected; and third means at each station, connected to said identifying means and to said supervisory unit, for setting the states of each station identifying means as selected in accordance with signals derived from said assigned address signals generated by said second means.

4. Apparatus controlling a plurality of peripheral units linked by common paths to a data processor including: selection means at each of said peripheral units, controlled by said data processor, for selecting individual ones of said peripheral units in a predetermined order; removable record storage means in each of said peripheral units storing as states signals representative of an assigned address; first means operative in each of said peripheral units, connected to said storage means and said common paths, for sending output signals, representing the storage means address states of the selected peripheral unit, to said data processor on selected ones of said common paths; unit address identifying means in each of said peripheral units for storing address input signals as states useable by said data processor for subsequent selection of particular ones of said peripheral units in other than said predetermined order; a second means in each of said peripheral units, connected to said common paths and said unit address, identifying means, when selected, for setting the unit address identifying means of the selected peripheral unit to states in accordance with address input signals derived from signals received from said data processor on selected others of said common paths; and third means in each of said peripheral units, connected to said common path and said identifying means, for selecting a peripheral unit whenever a subsequent address input signal corresponds to the unit address indicated by the identifying means in that peripheral unit.

5. In apparatus for permitting a computer to assign addresses to a number of tape units connected to said computer by a number of common data and control paths: a ring counter connected to the computer and to the tape units, controlled by said computer for selecting each of said tape units in sequence; skipping means in each of said tape units, connected to the ring, operative to cause the next tape unit in the sequence to be selected when a particular tape unit is not available before selection; reading means in each of said tape units, connected to said data paths, operative when its tape unit is selected, for transferring on said data paths to said computer, output address signals representative of states recorded on tape in said selected tape unit; register means in each of said tape units, connected to said control paths, operative when its tape unit is selected, for storing as states input unit address representative signals, derived from said output address signals, presented to said selected tape unit on said control paths by said computer; and means in each of said tape units, connected to said register means and said control paths, controlled by input address signals from said computer on said control paths, for selecting the associated tape unit if it has a unit address corresponding to said input address signals.

6. In apparatus for assigning addresses to a number of magnetic tape units connected to a computer by common data and control paths: first trigger means in each of said tape units settable to either one of an ON and an OFF state; input means in each of said tape units for receiving select signals operative, when said first trigger is set OFF, to set said first trigger ON; skipping means in each of said tape units for setting said first trigger ON when the corresponding tape unit is not available; select signal generation means in each of said tape units connected to said input means of the succeeding tape unit, operative whenever the corresponding one of said first triggers is set ON; control line means for supplying to said input means of a first of said tape units a select signal from said computer; second trigger means in each of said tape units settable to either one of an ON and an OFF state; circuit means in each of said tape units, operative when the corresponding one of said first trigger means is set ON by a select signal, for setting the corresponding one of said second trigger means ON; logic circuit means in each of said tape units for initiating reading onto said common data paths of address representative signals, stored as magnetic states on tape, by the corresponding tape unit when both corresponding first and second triggers are ON; address register means in each of said tape units, including a plurality of positions settable to either one of an ON and OFF state; input means in each of said tape units for receiving on said common control path address signals from said computer, derived from said address representative signals read onto said common data paths by said tape units, and for receiving on said common control paths from said computer set unit signals; gating means associated with said input means and said second trigger in each of said tape units for setting ON these register positions corresponding to said address signals, from said computer, when said second trigger is set ON and said set unit signal is present; means in each of said tape units for setting said second trigger means OFF when said set unit signal is present; and logic circuit means in each of said tape units for initiating an operation, specified by signals from said computer on others of said common control paths, by a tape unit having register position states corresponding to address signals from said computer on said common control paths.

References Cited by the Examiner

UNITED STATES PATENTS

| | | | |
|---|---|---|---|
| 2,680,155 | 6/1954 | Molnar | 340—172.5 |
| 2,885,659 | 5/1959 | Spielberg | 340—172.5 |
| 2,946,044 | 7/1960 | Bolgiano | 340—172.5 |
| 3,034,101 | 5/1962 | Loewe | 340—172.5 |
| 3,046,528 | 7/1962 | Rowe | 340—172.5 |

ROBERT C. BAILEY, *Primary Examiner.*

STEPHEN W. CAPELLI, MALCOLM A. MORRISON, *Examiners.*